United States Patent [19]
Van Krevelen

[11] Patent Number: 6,064,647
[45] Date of Patent: May 16, 2000

[54] METHOD AND SYSTEM FOR SENDING FRAMES AROUND A HEAD OF LINE BLOCKED FRAME IN A CONNECTION FABRIC ENVIRONMENT

[75] Inventor: Chris J. Van Krevelen, Coon Rapids, Minn.

[73] Assignee: Storage Technology Corporation, Louisville, Colo.

[21] Appl. No.: 09/078,149

[22] Filed: May 13, 1998

[51] Int. Cl.[7] .............................. H04J 3/14; G06F 13/00
[52] U.S. Cl. .......................... 370/228; 370/360; 370/386; 340/825.01; 340/827; 709/239
[58] Field of Search ..................... 370/216, 217, 370/221, 228, 231, 235, 351, 352, 357, 360, 362, 386, 387, 388, 462; 340/825.01, 825.03, 826, 827; 379/219, 220, 221, 271, 272, 273, 291, 335; 709/238, 239; 714/1, 2, 3, 4

[56] References Cited

U.S. PATENT DOCUMENTS

| | | | |
|---|---|---|---|
| 5,010,550 | 4/1991 | Hirata ....................................... | 370/228 |
| 5,307,466 | 4/1994 | Chang . | |
| 5,463,486 | 10/1995 | Stevens . | |
| 5,623,698 | 4/1997 | Stephenson et al. . | |
| 5,638,516 | 6/1997 | Duzett et al. ............................ | 709/239 |
| 5,740,346 | 4/1998 | Wicki et al. ............................. | 370/352 |
| 5,815,023 | 9/1998 | Webber et al. .......................... | 327/407 |
| 5,857,087 | 1/1999 | Bemanian et al. ...................... | 709/235 |

*Primary Examiner*—Alpus H. Hsu
*Attorney, Agent, or Firm*—Brooks & Kushman P.C.

[57] ABSTRACT

A method and system for transmitting data frames from a source path to a primary destination path having more than one source path requesting access thereto in a crossbar interconnect network includes a primary source buffer associated with each of the source paths for receiving a first data frame for transmission to a primary destination path via a primary connection. An alternate source buffer is also provided for each of the source paths for receiving a second data frame for transmission to an alternate destination path via an alternate connection upon determining the primary destination path is busy and the primary connection cannot be made immediately. A destination arbitrator coupled to the destination paths queues connections upon receipt of the connections and initiates the connections when the destination paths are not busy. A source arbitrator, coupled to the source paths and in communication with the destination arbitrator, transmits the second data frame to the alternate destination path via the alternate connection while waiting for the primary connection to be made if the alternate destination path is not busy. If the alternate destination path is busy, the source arbitrator monitors the primary destination path and the alternate destination path to determine when one of the primary and alternate connections has been made in order to transmit either the first or second data frames to the corresponding primary and alternate destination paths.

31 Claims, 6 Drawing Sheets

METHOD AND SYSTEM FOR SENDING FRAMES AROUND A HEAD OF LINE BLOCKED FRAME IN A CONNECTION FABRIC ENVIRONMENT

TECHNICAL FIELD

This invention relates to methods and systems for sending frames around a head of line blocked frame in a connection fabric environment that utilizes serial or parallel crossbar switch technology so as to reduce head of line blocking.

BACKGROUND ART

In a connection fabric environment, output, or source, paths of a card are connected to input, or destination, paths of another card utilizing serial or parallel crossbar switch technology. Each card in the system has N input paths and M output paths. Each source path can request to send data to a destination path, but it must then wait for the destination path to become available for use. If some other path is using the requested destination path, the source path must wait until the destination path is free. This will block the source path from sending data to any other path until this connection is made and the data is sent. This problem is known as head of line blocking. If the source path has any other data to send to a different destination path, it can't send it even if the different destination path is not busy.

Thus, there exists a need for allowing a source path to make a second request to an alternate destination path if the first request cannot be made immediately due to the first requested destination path being connected to some other source path.

DISCLOSURE OF THE INVENTION

It is a general object of the present invention to provide a method and system for providing an alternate connection in a connection fabric environment when a primary connection cannot be made immediately, yet remains queued so that it may eventually be made.

In carrying out the above object and other objects, features, and advantages of the present invention, a method is provided for transmitting data from a source path to a destination path in a crossbar interconnect network wherein the source path has a primary source buffer associated therewith for receiving a first data frame for transmission to a corresponding primary destination path via a primary connection. The method includes providing an alternate source buffer associated with the source path for receiving a second data frame for transmission to an alternate destination path via an alternate connection upon determining the primary destination path is busy indicating the primary connection cannot be made immediately. The method further includes determining if the alternate destination path is busy and, if not, transmitting the second data frame to the alternate destination path via the alternate connection. If the alternate destination path is busy indicating the alternate connection cannot be made immediately, the method includes monitoring the primary destination path and the alternate destination path to determine when one of the primary and alternate connections has been made in order to transmit one of the first and second data frames to the corresponding one of the primary and alternate destination paths.

In further carrying out the above object and other objects, features, and advantages of the present invention, a system is also provided for carrying out the steps of the above described method. The system includes an alternate source buffer associated with the source path for receiving a second data frame for transmission to an alternate destination path via an alternate connection upon a determination that the primary destination path is busy indicating the primary connection cannot be made immediately. The system also includes a destination arbitrator coupled to the primary and alternate destination paths for determining if the alternate destination path is busy. Still further, the system includes a source arbitrator coupled to the source path and in communication with the destination arbitrator for transmitting the second data frame to the alternate destination path via the alternate connection if the alternate destination path is not busy and, if the alternate destination path is busy, for monitoring the primary destination path and the alternate destination path to determine when one of the primary and alternate connections has been made in order to transmit one of the first and second data frames to the corresponding one of the primary and alternate destination paths.

The above object and other objects, features and advantages of the present invention are readily apparent from the following detailed description of the best mode for carrying out the invention when taken in connection with the accompanying drawings.

BRIEF DESCRIPTION OF THE DRAWINGS

FIGS. 2a–2f are flow diagrams illustrating the general sequence of steps associated with the operation of the present invention.

BEST MODES FOR CARRYING OUT THE INVENTION

Figure 1:
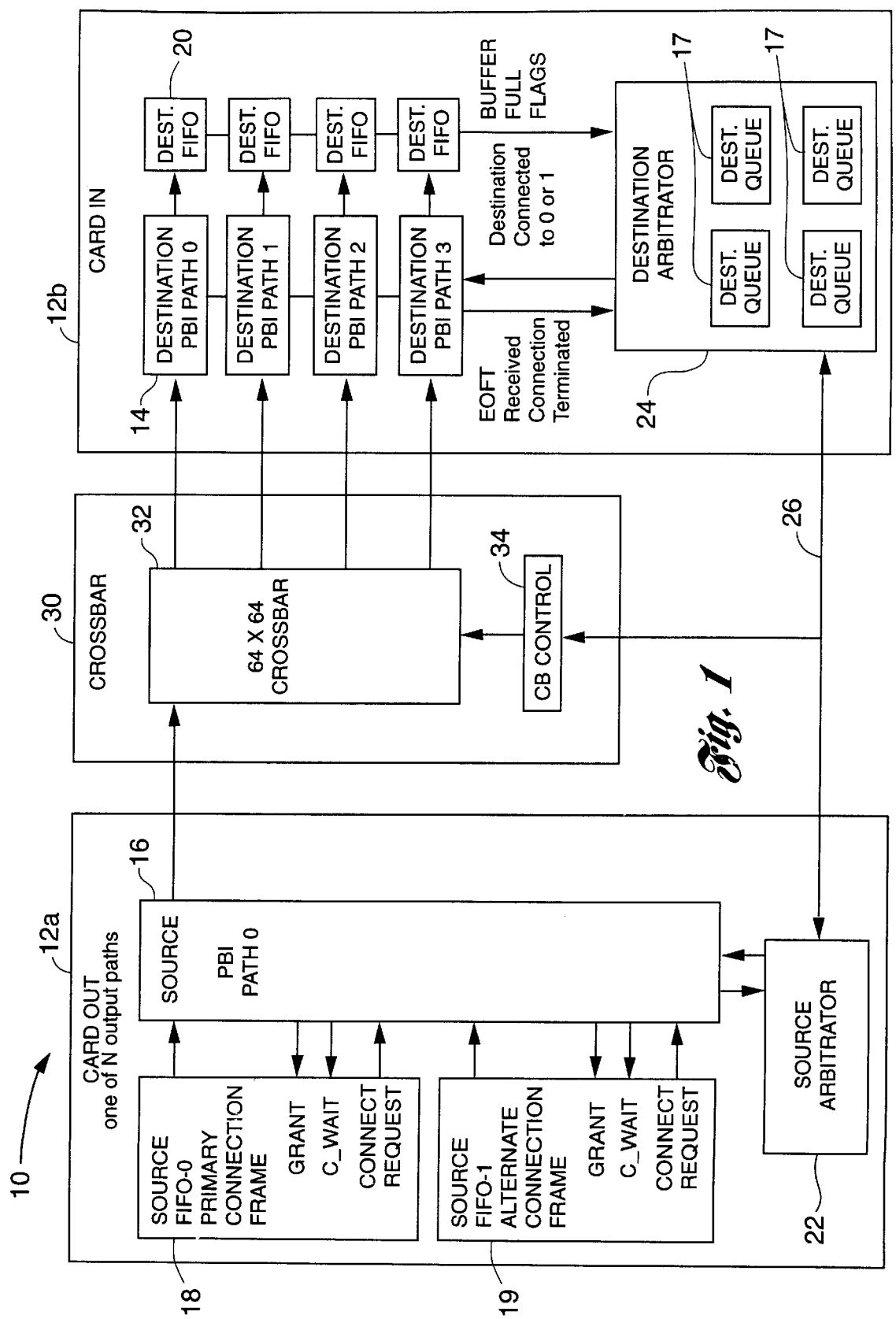
FIG. 1 is a schematic block diagram of a connection fabric environment suitable for the present invention.
Figure 2A:
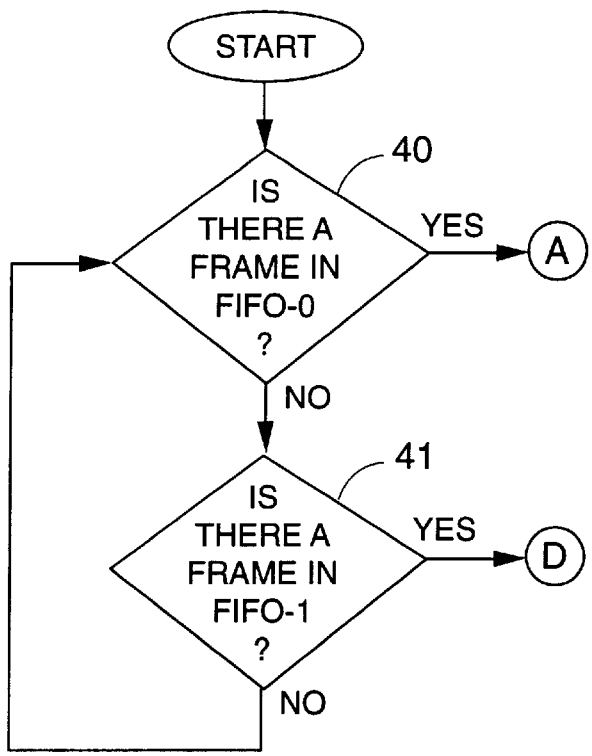
Figure 2B:
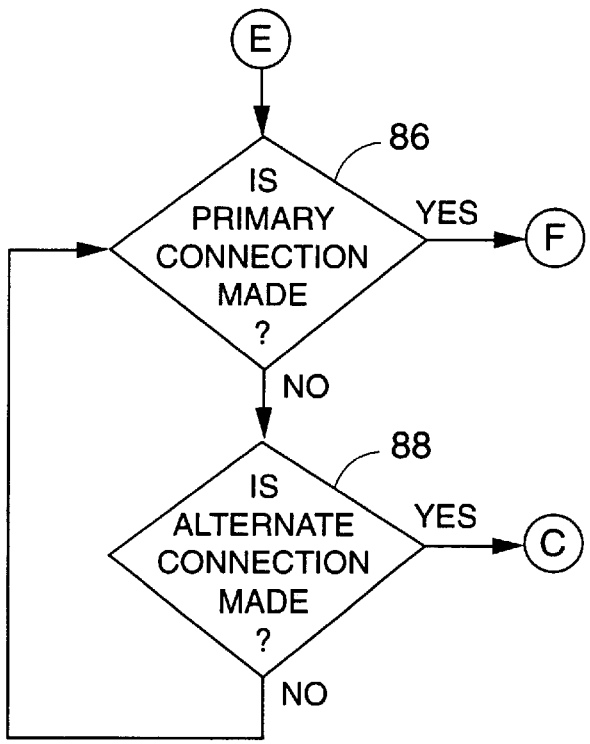
Figure 2C:
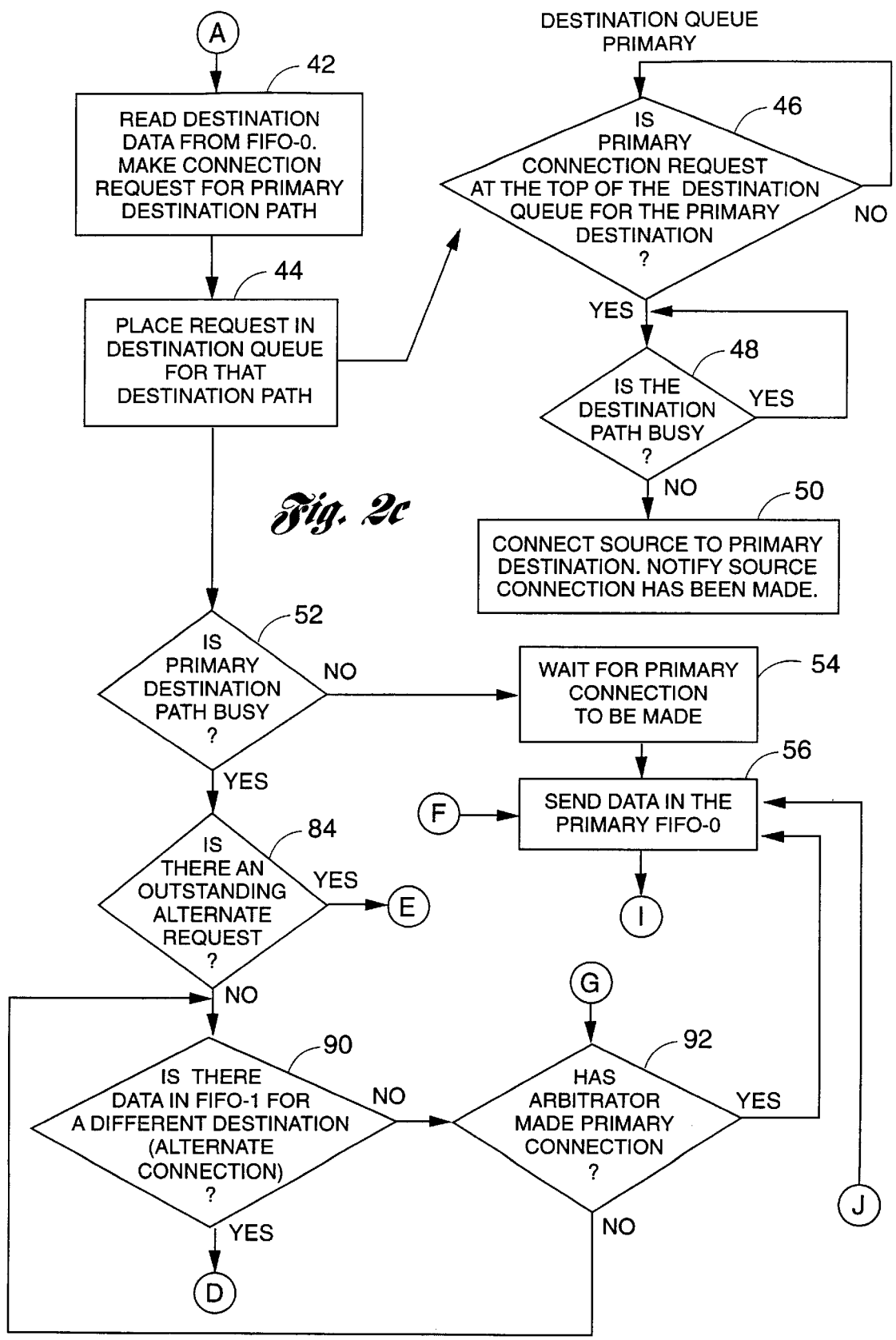
Figure 2B:
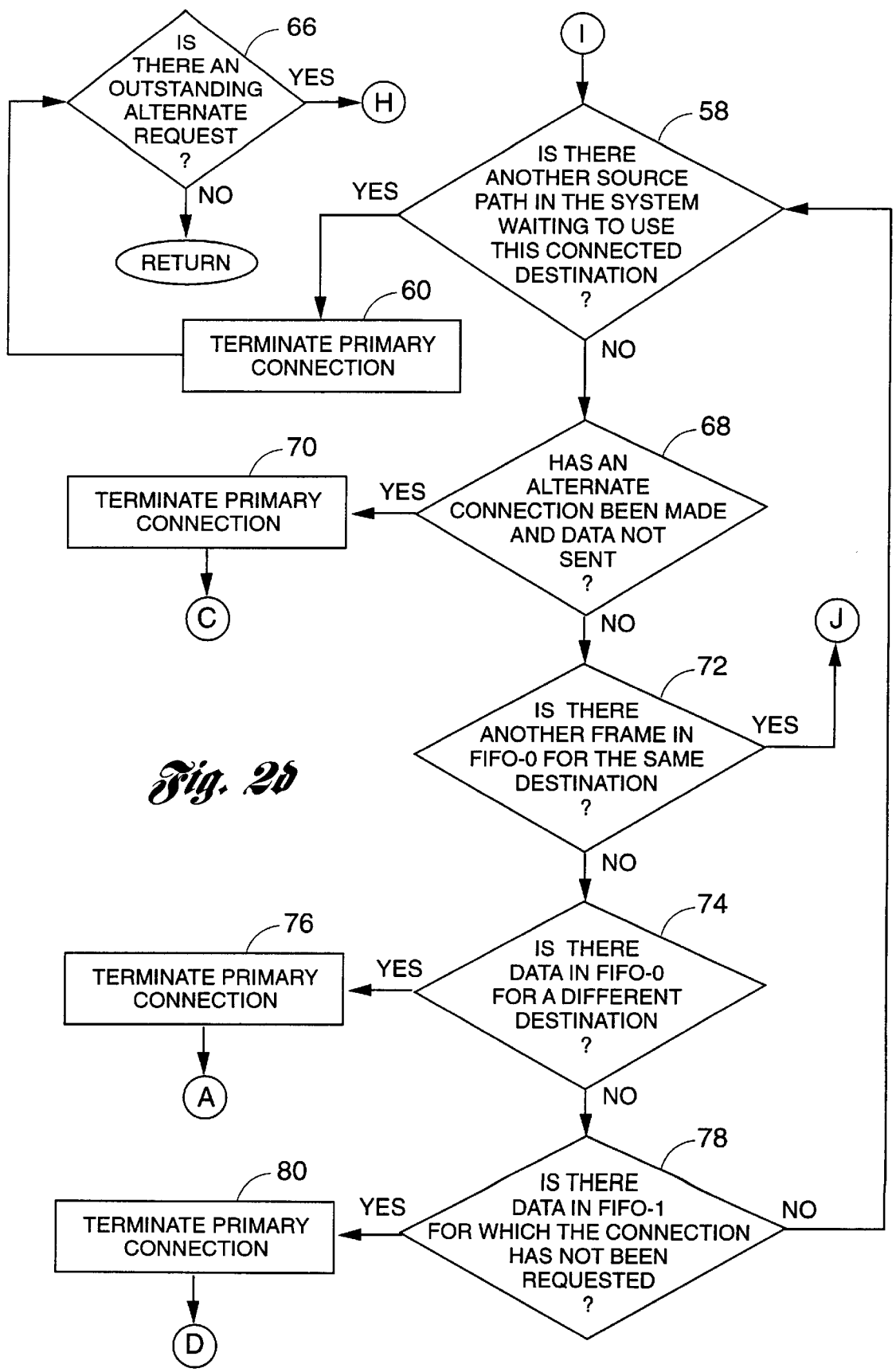
Figure 2E:
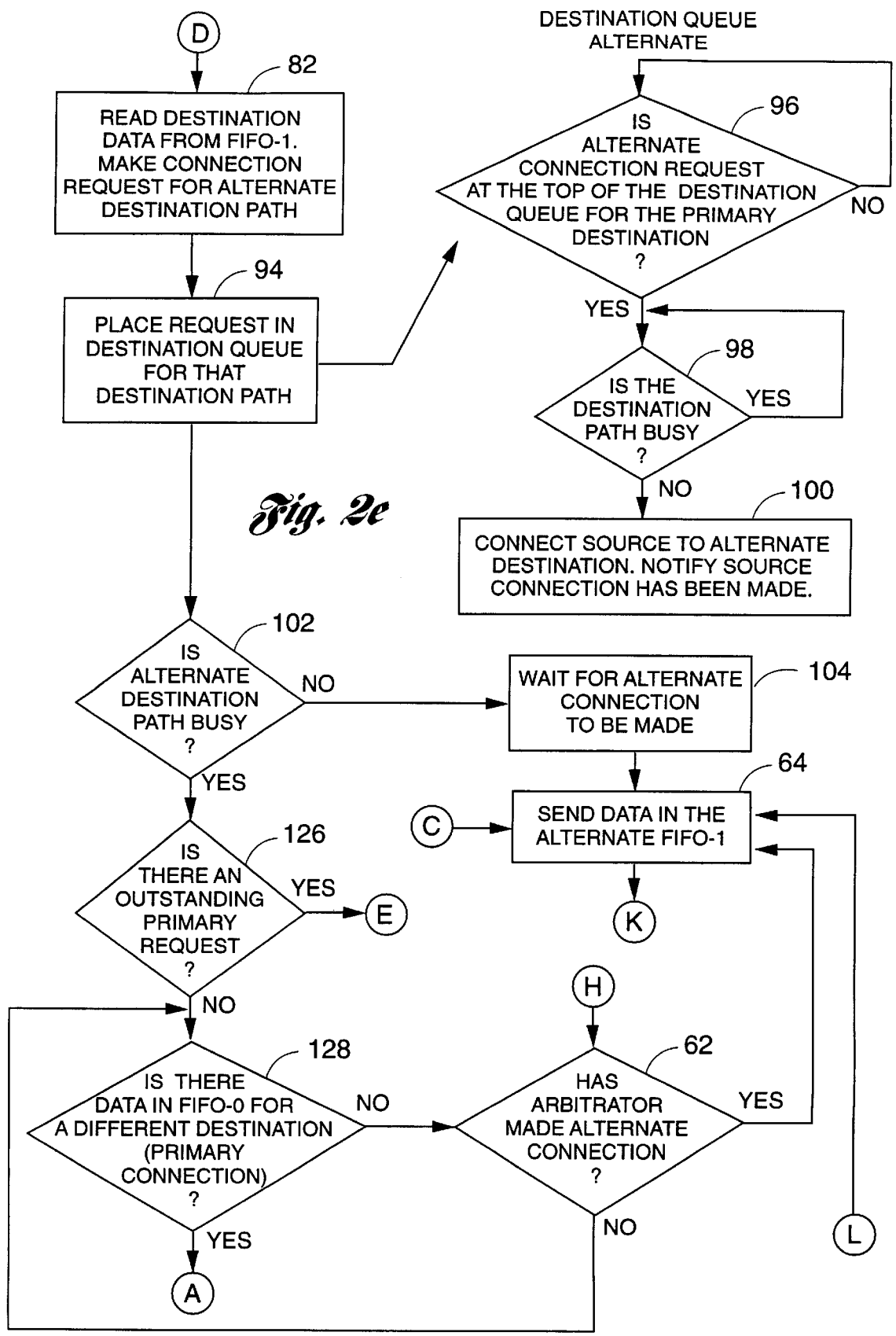
Figure 2F:
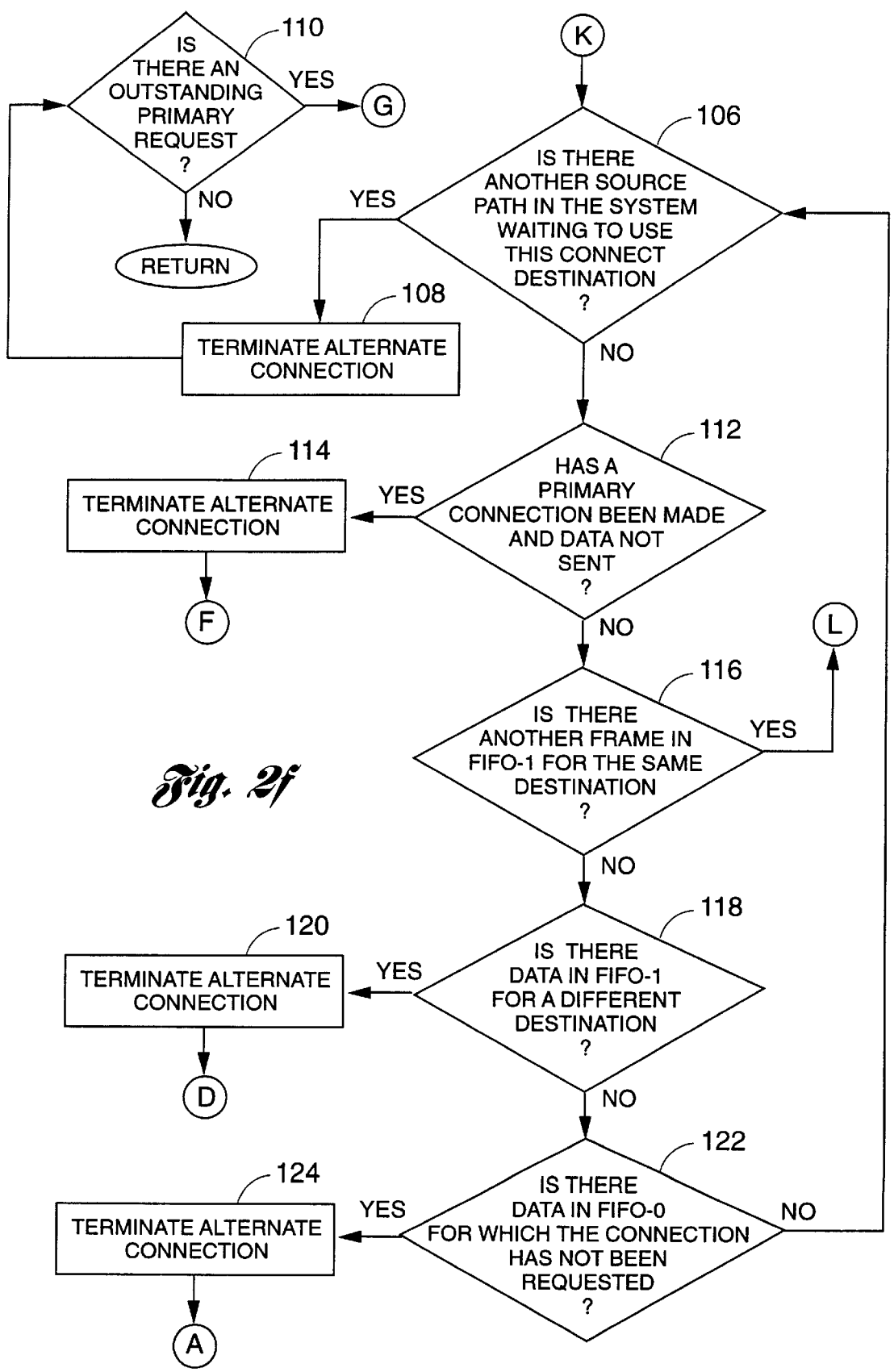

FIG. 1 is a schematic block diagram of a connection fabric environment in which the present invention may be employed, denoted generally by reference numeral 10. The system 10 includes a plurality of cards 12, two of which are shown as 12a, 12b. Each of the cards 12 have N input/destination paths 14 and M output/source paths 16 for communicating with each of the other cards. For example, the system 10 may include sixteen cards each having four inputs and four outputs. However, the number of inputs does not have to equal the number of outputs. Furthermore, for ease of illustration, only one source path 16 is shown for card 12a while only four destination paths 14 are shown for card 12b. In actuality, card 12a would have three additional source paths 16 and similar destination paths 14 as card 12b, and card 12b would have similar source paths 16 as card 12a.

Each of the source paths 16 has two source buffers associated therewith, a primary buffer 18 and an alternate buffer 19. Each of the source buffers 18,19 store data and connection information for receipt by its respective source path 16. A frame of data is stored in the buffers 18,19 in which the first line of the frame instructs the source path 16 as to the desired destination path for sending the data.

Primary source buffer 18 stores a first/primary data frame with connection information. If the primary connection cannot be made right away because the requested destination path 14 is connected to some other source and receiving data, the source path 16 is notified that the primary connection request has been put in a queue by way of a c_wait (connection wait) signal. At the same time, the primary connection request is stored in a destination queue 17, or buffer, associated with the primary destination path 14. The present invention includes at least one destination queue 17 associated with each destination path 14 and in communication with a destination arbitrator 24, described below. Although the destination queues 17 shown in FIG. 1 are disposed within destination arbitrator 24, destination queues 17 may be centrally located.

Alternate source buffer 19 is utilized to make a second/alternate connection request to an alternate destination path 14 only if the primary connection request cannot be made immediately. The alternate connection request may be made right away if the alternate destination path 14 is not busy, and the source path 16 can send the associated data. If, however, the alternate destination path 14 is also busy, the alternate connection request also goes into a connect wait state while the request is stored in the corresponding alternate destination queue 17. The source path 16 must then wait until a connection to either the primary or alternate destination path 14 is made.

Each of the destination paths 14 also has a destination buffer 20 associated therewith for storing the data received by its respective destination path 14 until retrieved for subsequent processing or forwarding. Preferably, source buffers 18, 19, destination buffers 20, and destination queues 17 each have a first-in, first-out (FIFO) queue structure.

Each card 12 also includes a source arbitrator 22 and destination arbitrator 24, as shown in FIG. 1. Alternatively, source arbitrator 22 and destination arbitrator 24 may be centrally located to serve all of the cards 12. Source arbitrator 22 is in communication with each of the source paths 16 for receiving connection requests. Upon reading the frame of data stored in either the primary source buffer 18 or the alternate source buffer 19, as described above, source path 16 transmits the data frame to source arbitrator 22. Source arbitrator then determines which destination path 14 the data frame needs to be sent to and initiates a connection request. Each connection request is transferred to a bus 26 in order to be captured by the destination arbitrator 24 responsible for the requested destination path. Note that bus 26 is not needed in a central arbitrator configuration, i.e., the source arbitrator 22 and the destination arbitrator 24 are centrally located.

Each of the destination arbitrators 24 is in communication with their associated destination paths 14 and destination buffers 20. Destination arbitrator 24 captures each of the connection request commands for the destination paths 14 on its board 12b.

Connections between source paths 16 and destination paths 14 are accomplished via a crossbar card 30. Crossbar card 30 includes a switch 32 having 16×N inputs and 16×M outputs (where "16" represents the number of cards in the system) capable of connecting each of the source paths 16 to one of the destination paths 14 so as to transfer the data frames between each of the cards 12. Crossbar card 30 also includes a crossbar (CB) control 34 for monitoring the bus 26 and instructing the switch 32 as to which source path 16 should be connected to a particular destination path 14. It should be noted that all of the destination paths 14 can be connected at the same time if all of the source paths 16 need to send data to different destination paths. The present invention also supports broadcasting, wherein one source path 16 can send data to one or more or all destination paths 14 at one time.

If the primary destination path 14 associated with the primary connection request stored in the primary source buffer 18 is not in use, destination arbitrator 24 will post a connection command to the connect bus 26, as described above, so that the data frame may be transmitted.

However, if the primary destination path 14 is in use, source arbitrator 22 will send the c_wait signal to the primary source buffer 18 informing it to wait for the requested destination to be made, and a flag will be set in source arbitrator 22 to identify an outstanding request is present. Once the connection is granted, another flag will be set so that source arbitrator knows that a connection has been made, but the data frame has not yet been set.

The source arbitrator 22 will then transfer the alternate connection request stored in alternate buffer 19 to the bus 26 for capture by the appropriate destination arbitrator 24. If the alternate destination path 14 is not in use, destination arbitrator 24 will post a connection command to the connect bus 26. Otherwise, source arbitrator 22 will send the c_wait signal to the alternate source buffer 19 and store the request in a corresponding alternate destination queue 17.

When one of the primary and alternate connection requests are made, the source path 16 can then send the data frame to the respective destination path 14. After the data transfer is complete, the source path 16 can then send the data frame associated with the other connection if the associated connection is made. If not, the source path 16 can again request to send data to yet a second alternate destination path 14 while it continues to wait for the other connection.

There may be a time when the source path 16 is connected to more than one destination path 14, and if the source path 16 starts sending data, the data will end up at more than one destination. This situation may be handled by informing each of the destination paths 14 when they are connected if they are the primary connection or the alternate connection. At this time, the destination path 14 begins listening for a SOF (start of frame) in the data frame, which is either a zero or a one. If the data starts with an SOF-0 and the destination path 14 was told that it was the primary connection, the destination path 14 will then accept the packet of data. The destination path 14 that was informed it was the alternate connection will ignore the packet and continue to listen for an SOF-1. This allows a source path 14 to send two different kinds of packets without the wrong destination path 14 getting the wrong data. Alternatively, the header data immediately following the SOF may be used to inform the destination path which path the data is intended for.

Turning now to FIGS. 2a–2f, there are shown flow diagrams illustrating the general sequence of steps associated with the operation of the present invention. The method begins by determining if there is a frame of data in the primary source buffer 18, or FIFO-0, as shown at block 40. If so, the method proceeds to read the destination data from primary source buffer 18 and post a corresponding connection request for the appropriate destination path, as shown at block 42. If a data frame was not stored in the primary source buffer, the method would proceed to read the destination data from the alternate source buffer, i.e., FIFO-1, as shown at block 41, and as described in greater detail below.

Next, the request is placed in the corresponding primary destination queue 17, as shown at block 44. Connection type information is also stored with the connection request at the destination queue 17 indicating that the requested destination is a primary connection. Then the request will wait for its turn to use the primary destination path. That is, a determination is made as to whether or not the request is at the top, or front, of the destination queue 17 for the primary destination path 14, as shown at block 46. If not, the request continues to wait until it does become the next request at which time a determination is made as to whether the requested primary destination path is busy, as shown at block 48. If so, the request continues to wait until the primary destination path is no longer busy. Once the primary destination path becomes available, destination arbitrator 24 posts a connection command onto bus 26 so that CB control 34 can make the appropriate connection, as shown at block 50. That is, the source path will then be connected to the primary destination path. The source path can then begin sending data, including SOF-0 or other similar header information, once it is instructed to do so by the source arbitrator 22. The source arbitrator may either snoop the bus 26 to determine when the source path is connected or it may be informed accordingly by either the destination arbitrator 24 or the CB control 34.

Returning to block 44, once the request is placed in the appropriate destination queue 17, the method proceeds to determine if the primary destination path is busy, as shown at block 52, and as described above. As shown at block 54, if the primary destination path is not busy, the connection request waits for the connection to be made according to block 50. At this point, the source path 16 can then send the data in its primary source buffer 18, as shown at block 56.

Once the primary data has been sent, a determination is made as whether or not there is another source path waiting to use the connected destination path 14, as shown at block 58. If the source arbitrator 22 is aware of another source path 16 waiting to use the connected destination path 14, the connection is terminated, as shown at block 60, so that the other source path may be connected to the destination path 14.

If there is an outstanding alternate request stored in the alternate source buffer 19, the method proceeds to determine if the destination arbitrator 24 has made the alternate connection, as shown at block 62. If so, the data in the alternate source buffer 19 will be sent, block 64, and the method will proceed in a similar manner as when the primary source buffer 18 is connected and sends its data, as will be described in greater detail below. If there is not an outstanding alternate request, the method proceeds to return to the start of the program, as shown at block 66.

Returning now to block 58, if the source arbitrator 22 is not aware of any other source path 16 waiting to use the connected destination path 14, the method proceeds to determine if an alternate connection for the same source path 14 has been made but data has not yet been sent, as shown at block 68. At this point, the source path 16 is connected to two destination paths 14 at the same time. So, the source path 16 sends an EOFT (End Of Frame Terminate) to terminate the connection, as shown at block 70. The primary destination path 14 will then know to ignore any more data coming across the crossbar switch 32, and it can now connect to another source path 16 if an outstanding request is stored in its corresponding destination queue 17. The data stored in alternate source buffer 19 can then be sent starting with the SOF-1, as shown at block 64, and as described in greater detail below.

Returning to block 68, if the source path 16 does not have an alternate connection made, the method proceeds to determine if there is another frame in the primary source buffer 18 to be sent to the same destination path 14, as shown at block 72. If so, the method returns to block 56 to begin sending the data. If not, the method proceeds to determine if there is data in the primary source buffer 18 that is intended for a different destination path 14, as shown at block 74.

If there is data in the primary source buffer 18 intended for a different destination, the primary connection is terminated, as shown at block 76, and the method returns to block 42 so that a new connection can be made. If, however, there is no data in the primary source buffer 18 intended for a different destination, a determination is made as to whether there is data in the alternate source buffer 19 for which the connection has not been requested, as shown at block 78. If not, the method returns to block 58 in which case the primary connection remains intact. However, if there is data in the alternate source buffer 19, the primary connection is terminated, block 80, and the data is read for connection information, as shown at block 82, and as described in greater detail below. Thus, the primary connection is terminated once the primary data has been sent and some other source path 16 needs the same destination path or the alternate connection for the same source path 16 becomes available, or there is a frame of data for a different destination and the alternate request still has not come through.

Returning now to block 52, if the primary destination path 14 is busy, a check is made for an outstanding alternate request, as shown at block 84. The source arbitrator 22 can keep track of outstanding requests by setting appropriate flags as discussed above. A request is outstanding if it has been identified and placed in the appropriate destination queue 17. So, if there is an outstanding request, the method proceeds to block 86. If the primary connection is made, block 50, which is typically not the case here, the method proceeds to send the primary data, as shown and previously described at block 56. Otherwise, the method proceeds to determine if the alternate connection has been made by the destination arbitrator 24, as shown at block 88. If so, the data is sent as shown and previously described at block 64.

If there is not an already outstanding alternate request, a determination is made as to whether there is data in the alternate source buffer 19 for a different destination path 14, as shown at block 90. If not, a check is made again as to whether the primary connection has been made, as shown at block 92. If there is data in the alternate source buffer 19, the method proceeds to block 82 where the destination data from the alternate source buffer 19 is read and the corresponding connection request is made by source arbitrator 22.

The alternate request is placed in the destination queue 17 corresponding to the alternate destination path 14, as shown at block 94. Connection type information is also stored with the connection request at the destination queue 17 indicating that the connection is an alternate connection. As with the primary connection request, the alternate connection request is stored in the appropriate destination queue 17 until it is the next request to be made and continues to wait until the path 14 becomes available and the connection is made, blocks 96, 98 and 100.

Once the alternate destination path 14 is no longer busy, block 102, and the connection is made 104, the data can be sent, as shown at block 64, including the SOF-1 or other similar heading information indicating to the alternate destination path 14 that this is the data it can receive. Again, as with the primary connection, once the data is sent, a determination is made as to whether another source path 16 is waiting to use the alternate destination path 14, as shown at block 106. If so, the alternate connection is terminated, as shown at block 108. At block 110, if the source path 16 does not have an outstanding primary request as stored in primary source buffer 18, the method returns to the beginning of the program. However, if the source path 16 does have an outstanding primary request, the data is sent if the primary connection has been made, blocks 92 and 56. If the primary connection has not been made, a determination is made as to whether there is another alternate request to be made, as shown at block 90. If so, the method proceeds to repeat the steps described above. Otherwise, the method proceeds to wait for the primary connection to be made.

Returning to block 106, if there is not another source path 16 waiting to use the alternate destination path 14, a check is made as to whether a primary connection for the same source path 16 has been made but data has not yet been sent, as shown at block 112. If so, the alternate connection is terminated, block 114, so that the source path 16 is no longer connected to two different destination paths 14 at the same time. The data from the primary source buffer 19 can then be sent, as shown at block 56.

If there is no primary connection made, the method proceeds to determine if there is another frame of data in the alternate source buffer 19 for the same alternate destination path 14, as shown at block 116. If so, the method returns to block 64 and the data is sent. If not, a determination is made as to whether is there data in the alternate source buffer 19 for a different destination path 14, as shown at block 118. If so, the alternate connection is terminated, block 120, and the method returns to block 82 to read the new data and repeat the steps described above.

If there is no data in the alternate source buffer 19 for a different destination path 14, the method proceeds to determine if there is data in the primary source buffer 18 for which a connection has not been requested, as shown at block 122. If not, the alternate connection remains intact. If, however, there is data in the primary source buffer 18 for which connection has not been requested, the alternate connection is terminated, block 124, and the method returns to block 42 to read the new data and repeat the steps described earlier.

Returning now to block 102, if the alternate destination path is busy to begin with, the method determines if there is an outstanding primary request, as shown at block 126. If so, a loop is entered in which the method waits for one of the primary and alternate connections to be made, blocks 86 and 88. Once one of these connections are made, the corresponding data can be sent, as shown at blocks 56 and 64.

If the alternate destination path 14 is busy but there is no outstanding primary request, the method proceeds to determine if there is data in the primary source buffer 18, as shown at block 128. If so, the method returns to block 42 to read the new data and repeat the steps described earlier. Otherwise, the method continues to wait for the alternate connection to be made, as shown at block 62.

The present invention is a solution to the common problem of head of line blocking experienced in this kind of backplane. If the primary requested connection is busy, the source is not blocked from sending more data if the alternate requested connection is available. The primary requested connection does not loose its place in the queue since the source path will start sending data to whichever connection becomes available first.

While the best modes for carrying out the invention have been described in detail, those familiar with the art to which this invention relates will recognize various alternative designs and embodiments for practicing the invention as defined by the following claims. For example, although the present invention has been described utilizing two source buffers associated with each source path, additional source buffers could be used. However, additional hardware cost will be required; and with more connections waiting, more destination paths will be tied up if all connections come through at once.

What is claimed is:

1. For use in a crossbar interconnect network including a plurality of source paths for originating data frames and a plurality of destination paths for receiving the data frames, a method for transmitting data frames from a source path to a primary destination path having more than one source path requesting access thereto, the source path having a primary source buffer associated therewith for receiving a first data frame from the source path for transmission to the primary destination path via primary connection through a crossbar card capable of connecting the source path to the primary destination path, the method comprising:

providing an alternate source buffer associated with the source path for receiving a second data frame for transmission to an alternate destination path via an alternate connection through the crossbar card capable of connecting the source path to the alternate destination path upon determining the primary destination path is busy wherein the primary destination path is busy when the primary connection cannot be made;

determining if the alternate destination path is busy wherein the alternate destination path is busy when the alternate connection cannot be made;

if not, transmitting the second data frame to the alternate destination path via the alternate connection while waiting for the primary connection to be made; and if so, monitoring the primary destination path and alternate destination path to determine when one of the primary and alternate connections has been made in order to transmit one of the first and second data frames to the corresponding one of the primary and alternate destination paths.

2. The method as recited in claim 1 further comprising:

storing primary connection information in a primary buffer associated with the primary destination path upon receiving the first data frame, the primary connection information identifying the primary destination path as the primary connection.

3. The method as recited in claim 2 further comprising:

storing alternate connection information in an alternate buffer memory associated with the alternate destination path upon receiving the second data frame, the alternate connection information identifying the alternate destination path as the alternate connection.

4. The method as recited in claim 3 wherein the primary and alternate buffers have first-in first-out memories.

5. The method as recited in claim 3 wherein transmitting the second data frame includes:

transmitting the second data frame with an alternate connection request identifying the second data frame as data intended for the alternate connection.

6. The method as recited in claim 5 wherein monitoring the primary destination path and the alternate destination path includes:

transmitting the first data frame with a primary connection request identifying the first data frame as data intended for the primary connection when the primary connection has been made; and transmitting the second data frame with the alternate connection request when the alternate connection has been made.

7. The method as recited in claim 6 wherein the primary and alternate connection requests precede the first and second data frames, respectively, as a start of frame and a digit having one of a first and second value, wherein the digit has the first value when associated with the first data frame and the second value when associated with the second data frame.

8. The method as recited in claim 7 wherein the digit is a binary number.

9. The method as recited in claim 6 wherein each of the first and second data frames includes header data and wherein each of the primary and alternate connection requests is included in the header data.

10. The method as recited in claim 5 wherein transmitting the second data frame further includes:

terminating the alternate connection after the second data frame has been sent if a second source path is waiting to access the alternate destination path.

11. The method as recited in claim 10 wherein transmitting the second data frame further includes:

determining if the primary destination path is no longer busy and the primary connection has been made;

if so, terminating the alternate connection upon completing transmission of the second data frame; and transmitting the first data frame with the primary connection request to the primary destination path.

12. The method as recited in claim 11 wherein transmitting the second data frame further includes:

terminating the alternate connection upon completing transmission of the second data frame if there is a third data frame in the secondary source buffer intended for a second alternate destination path, different from the alternate destination path; and transmitting the third data frame if the second alternate destination path is not busy and a corresponding second alternate connection has been made.

13. The method as recited in claim 6 wherein transmitting the first data frame includes:

terminating the primary connection upon completing transmission of the first data frame if another source path is waiting to access the primary destination path.

14. The method as recited in claim 13 wherein transmitting the first data frame further includes:

determining if the alternate destination path is no longer busy and the alternate connection has been made;

if so, terminating the primary connection upon completing transmission of the first data frame; and transmitting the second data frame with the alternate connection request to the alternate destination path.

15. The method as recited in claim 14 wherein transmitting the first data frame further includes:

terminating the primary connection upon completing transmission of the first data frame if there is a fourth data frame in the primary source buffer intended for a second primary destination path different from the primary destination path; and transmitting the fourth data frame if the second primary destination path is not busy and a corresponding second primary connection has been made.

16. For use in a crossbar interconnect network including a plurality of source paths for originating data frames and a plurality of destination paths for receiving the data frames, a system for transmitting data frames from a source path to a primary destination path having more than one source path requesting access thereto, the source path having a primary source buffer associated therewith for receiving a first data frame from the source path for transmission to the primary destination path via a primary connection, the system comprising:

an alternate source buffer associated with the source path for receiving a second data frame from the source path for transmission to an alternate destination path via an alternate connection upon determining the primary destination path is busy wherein the primary destination path is busy when the primary connection cannot be made;

a destination arbitrator coupled to the destination paths operative to queue connections upon receipt of the connections and initiate the connections when the destination paths are not busy; and a source arbitrator, coupled to the source paths and in communication with the destination arbitrator, operative to transmit the second data frame to the alternate destination path via the alternate connection while waiting for the primary connection to be made if the alternate destination path is not busy and, if the alternate destination path is busy, monitor the primary destination path and the alternate destination path to determine when one of the primary and alternate connections has been made in order to transmit one of the first and second data frames to the corresponding one of the primary and alternate destination paths, wherein the alternate destination path is busy when the alternate connection cannot be made.

17. The system as recited in claim 16 further comprising:

a primary buffer associated with the primary destination path for storing primary connection information upon receiving the first data frame, the primary connection information identifying the primary destination path as the primary connection.

18. The system as recited in claim 17 further comprising:

an alternate buffer associated with the alternate destination path for storing alternate connection information upon receiving the second data frame, the alternate connection information identifying the alternate destination path as the alternate connection.

19. The system as recited in claim 18 wherein the primary and alternate buffers have first-in first-out memories.

20. The system as recited in claim 18 wherein the source arbitrator, in transmitting the second data frame, is further operative to transmit the second data frame with an alternate connection request identifying the second data frame as data intended for the alternate connection.

21. The system as recited in claim 20 wherein the source arbitrator, in monitoring the primary destination path and the alternate destination path, is further operative to transmit the first data frame with a primary connection request identifying the first data frame as data intended for the primary connection when the primary connection has been made and transmit the second data frame with the alternate connection request when the alternate connection has been made.

22. The system as recited in claim 21 wherein the primary and alternate connection requests precede the first and second data frames, respectively, as a start of frame and a digit having one of a first and second value, wherein the digit has the first value when associated with the first data frame and the second value associated with the second data frame.

23. The system as recited in claim 22 wherein the digit is a binary number.

24. The system as recited in claim 21 wherein each of the first and second data frames includes header data and wherein each of the primary and alternate connection requests is included in the header data.

25. The system as recited in claim 20 wherein, in transmitting the second data frame, the destination arbitrator is further operative to terminate the alternate connection after the second data frame has been sent if a second source path is waiting to access the alternate destination path.

26. The system as recited in claim 25 wherein, in transmitting the second data frame, the destination arbitrator is further operative to determine if the primary destination path is no longer busy and the primary connection has been made and terminate the alternate connection upon completing transmission of the second data frame if the primary connection has been made, and wherein the source arbitrator is further operative to transmit the first data frame with the primary connection request to the primary destination path.

27. The system as recited in claim 26 wherein, in transmitting the second data frame, the destination arbitrator is further operative to terminate the alternate connection upon completing transmission of the second data frame if there is a third data frame in the secondary source buffer intended for a second alternate destination path, different from the alternate destination path, and wherein the source arbitrator is further operative to transmit the third data frame if the second alternate destination path is not busy and a corresponding second alternate connection has been made.

28. The system as recited in claim 21 wherein, in transmitting the first data frame, the destination arbitrator is further operative to terminate the primary connection upon completing transmission of the first data frame if another source path is waiting to access the primary destination path.

29. The system as recited in claim 28 wherein, in transmitting the first data frame, the destination arbitrator is further operative to determine if the alternate destination path is no longer busy and the alternate connection has been made and terminate the primary connection upon completing transmission of the first data frame if the alternate connection has been made, and wherein the source arbitrator is further operative to transmit the second data frame with the alternate connection request to the alternate destination path.

30. The system as recited in claim 29 wherein, in transmitting the first data frame, the destination arbitrator is further operative to terminate the primary connection upon completing transmission of the first data frame if there is a fourth data frame in the primary source buffer intended for a second primary destination path different from the primary destination path, and wherein the source arbitrator is further operative to transmit the fourth data frame if the second primary destination path is not busy and a corresponding second primary connection has been made.

31. The system as recited in claim 16 further comprising a crossbar card capable of connecting each of the source paths to one of the destination paths to transfer the data frames.

* * * * *